Patented Oct. 17, 1933

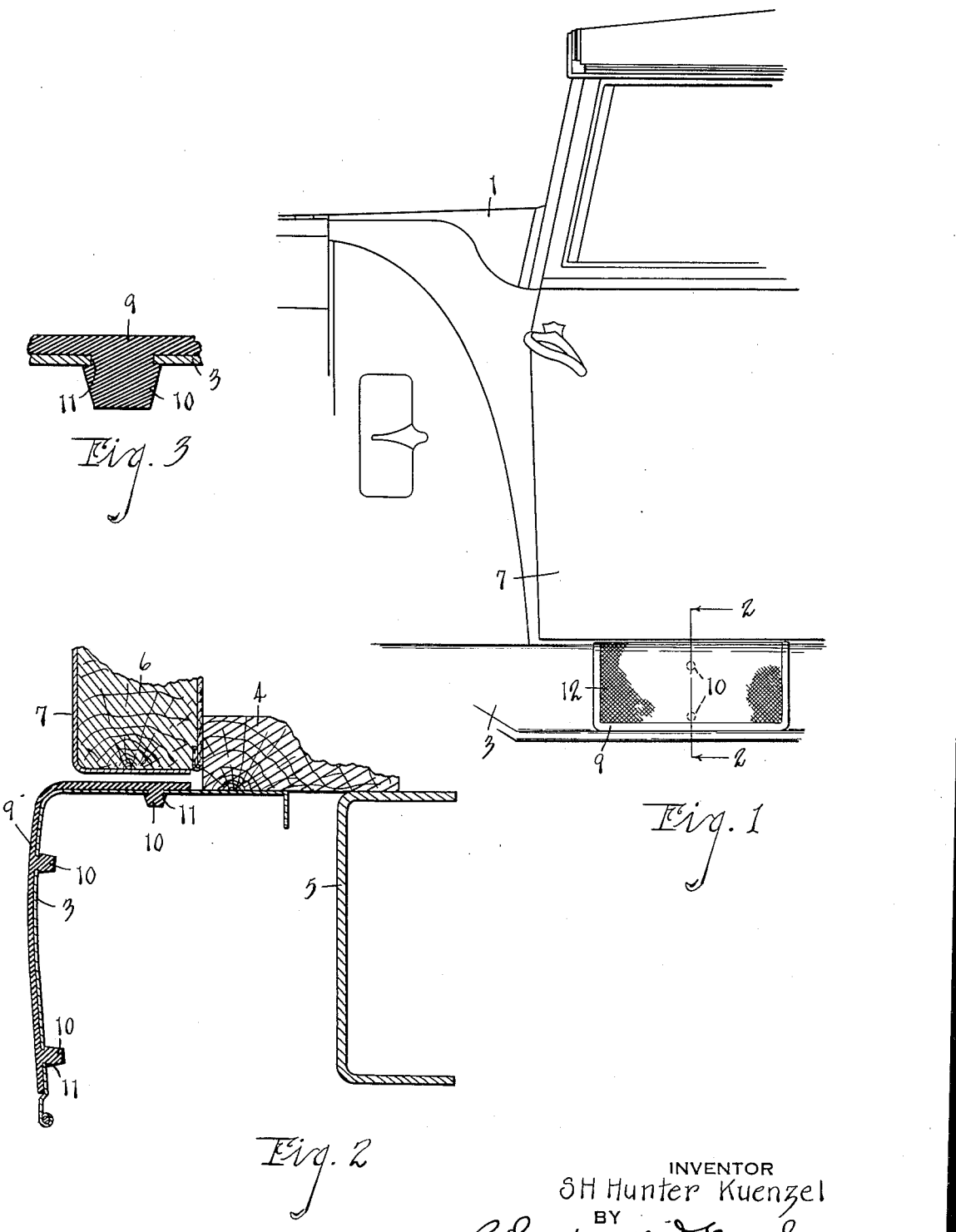

1,930,719

UNITED STATES PATENT OFFICE 1,930,719

AUTOMOBILE APRON PROTECTOR

S H Hunter Kuenzel, Kalamazoo, Mich., assignor to Checker Cab Manufacturing Corporation, Kalamazoo, Mich.

Application April 18, 1931. Serial No. 531,061

1 Claim. (Cl. 280—163)

The main object of this invention is to provide an apron protector for the apron of an automobile.

Another object of my invention is to provide an apron protector which is economical to manufacture, efficient in operation and one that may be readily adapted to and securely held by the apron to be protected.

Objects relating to details and economies of my invention will appear from the description to follow. The invention is defined and pointed out in the claim.

A structure which is a preferred embodiment of my invention is illustrated in the accompanying drawing, in which:

Fig. 1 is a view in side elevaton of a portion of the body of an automobile having the apron protector of my invention associated therewith.

Fig. 2 is a cross sectional view of the body taken on line 2—2 of Fig. 1, and

Fig. 3 is an enlarged view showing how the apron protector is adapted to and interlocks with holes provided therefor in the apron.

Referring to the drawing, 1 designates the body of a modern conventional type of automobile having an apron or dust shield 3 extending from the body frame sill 4 and terminating in a rolled edge 2. The body frame sill 4 is preferably made of wood and is supported by an angle metal chassis frame sill 5 of the usual type.

The apron 3 may be of the conventional spaced sheet metal construction having a horizontal surface and a vertical surface as shown.

Numeral 6 indicates the lower wooden frame of the door 7 of the automobile.

The horizontal and vertical surfaces of the apron 3 are protected under the door 7 by an apron protector 9 of rubber or rubber-like material.

The apron protector 9 is provided with integral rearwardly extending bosses 10 which are tapered towards their ends to facilitate their insertion into holes 11 provided therefor in the apron 3. The bases of the bosses 10 are preferably provided with recesses for interlocking with the edges of the holes 11 when the bosses are forced home in the holes.

As indicated by the drawing, I prefer to use bosses in the top as well as in the sides of the apron protectors. It will be understood that the bosses may be located in any convenient position and may be of any convenient number without departing from the spirit of my invention.

The outer surface of the apron protector 9 may be ornamented by embossing 12 of any suitable design, or it may be left perfectly plain if desired.

After the apron protector 9 has been put in place and the bosses 10 secured to the openings 11 in the apron 3, the apron protector is thereafter firmly secured to the apron with little or no likelihood that it will ever fall out of its intended position.

Various changes may be made in the details of construction of the preferred embodiment of my invention without departing from the scope thereof as set forth in the following claim.

Having thus described my invention what I claim as new and desire to secure by Letters Patent is:

In an automobile, the combination with a running board, and a sheet metal dust shield at the back of said running board of substantially inverted L-shape, of a protector for only a portion of the length of said dust shield comprising a separately formed rubber mat of inverted L-shape adapted to overlie the top and side of said shield facing the running board, said dust shield having spaced boss receiving holes in the side and top walls thereof, and said rubber mat having integral rearwardly extending conical bosses disposed through and interlocking with the edges thereof, the lower edge of said mat being spaced from the rear edge of said running board.

S H HUNTER KUENZEL.